United States Patent
Lee

(10) Patent No.: US 8,335,269 B2
(45) Date of Patent: Dec. 18, 2012

(54) APPARATUS FOR RECEIVING SIGNALS IN A COMMUNICATION SYSTEM BASED ON MULTICARRIER TRANSMISSION AND METHOD FOR INTERFERENCE CANCELLATION

(75) Inventor: Jun-Hwan Lee, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 155 days.

(21) Appl. No.: 12/846,388

(22) Filed: Jul. 29, 2010

(65) Prior Publication Data

US 2011/0142180 A1    Jun. 16, 2011

(30) Foreign Application Priority Data

Dec. 16, 2009   (KR) .................. 10-2009-0125664
Apr. 17, 2010   (KR) .................. 10-2010-0036026

(51) Int. Cl.
*H04L 27/28*    (2006.01)

(52) U.S. Cl. ........ 375/260; 375/144; 375/346; 375/348; 455/63.1; 455/296; 329/320; 329/349

(58) Field of Classification Search .............. 375/260, 375/144, 346, 348; 455/63.1, 296; 329/320, 329/349
See application file for complete search history.

(56) References Cited

U.S. PATENT DOCUMENTS

| | | | |
|---|---|---|---|
| 2004/0091057 A1* | 5/2004 | Yoshida | 375/260 |
| 2004/0184550 A1* | 9/2004 | Yoshida et al. | 375/260 |
| 2005/0286406 A1* | 12/2005 | Jeon et al. | 370/208 |
| 2006/0146945 A1* | 7/2006 | Chow et al. | 375/260 |
| 2006/0159196 A1* | 7/2006 | Kwun et al. | 375/267 |
| 2008/0159449 A1 | 7/2008 | Tian et al. | |

FOREIGN PATENT DOCUMENTS

JP    2004-208254 A    7/2004

* cited by examiner

*Primary Examiner* — Sam K Ahn
*Assistant Examiner* — Leila Malek
(74) *Attorney, Agent, or Firm* — Kile Park Goekjian Reed & McManus PLLC

(57) ABSTRACT

Provided are an apparatus and method of receiving signals in a communication system based on multicarrier transmission. The receiving apparatus cancels Inter-Symbol Interference (ISI) in a time domain from a received signal having a delay time above a guard interval, and cancels Inter-Carrier Interference (ICI) in a frequency domain from the received signal.

10 Claims, 8 Drawing Sheets

FIG. 3

$$H \begin{bmatrix} h_0 & 0 & 0 & 0 & 0 & 0 & 0 & 0 \\ h_1 & h_0 & 0 & 0 & 0 & 0 & 0 & 0 \\ \cdot & h_1 & \cdot & 0 & 0 & 0 & 0 & 0 \\ h_{M-1} & \cdot & \cdot & h_0 & 0 & 0 & 0 & 0 \\ 0 & h_{M-1} & \cdot & h_1 & h_0 & 0 & 0 & 0 \\ 0 & 0 & \cdot & \cdot & h_1 & \cdot & 0 & 0 \\ 0 & 0 & 0 & h_{M-1} & \cdot & \cdot & h_0 & 0 \\ 0 & 0 & 0 & 0 & h_{M-1} & \cdot & h_1 & h_0 \end{bmatrix}$$

$$= H_{ICI} \begin{bmatrix} h_0 & 0 & 0 & 0 & 0 & 0 & 0 & 0 \\ h_1 & h_0 & 0 & 0 & 0 & 0 & 0 & 0 \\ \cdot & h_1 & \cdot & 0 & 0 & 0 & 0 & 0 \\ h_{M-1} & \cdot & \cdot & h_0 & 0 & 0 & 0 & 0 \\ 0 & h_{M-1} & \cdot & h_1 & h_0 & 0 & 0 & 0 \\ 0 & 0 & \cdot & \cdot & h_1 & \cdot & 0 & 0 \\ 0 & 0 & 0 & h_{M-1} & \cdot & \cdot & h_0 & 0 \\ 0 & 0 & 0 & 0 & h_{M-1} & \cdot & h_1 & h_0 \end{bmatrix}$$

$$+ H_{ISI} \begin{bmatrix} 0 & h_1 & \cdots & h_{M-1} & 0 & 0 & 0 & 0 \\ 0 & 0 & \cdot & \cdot & 0 & 0 & 0 & 0 \\ 0 & 0 & 0 & h_{M-1} & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix}$$

APPARATUS FOR RECEIVING SIGNALS IN A COMMUNICATION SYSTEM BASED ON MULTICARRIER TRANSMISSION AND METHOD FOR INTERFERENCE CANCELLATION

CROSS-REFERENCE TO RELATED APPLICATION

This application claims the benefit under 35 U.S.C. §119 (a) of a Korean Patent Applications Nos. 10-2009-0125664, filed on Dec. 16, 2009, and 10-2010-0036026, filed on Apr. 17, 2010, the entire disclosures of which are incorporated herein by reference for all purposes.

BACKGROUND

1. Field

The following description relates to a communication technology based on multicarrier transmission, and more particularly, to a technique for cancelling interference between symbols or subcarriers even when a delayed wave having a delay time above a guard interval is generated.

2. Description of the Related Art

Recently, multicarrier transmission has started being adopted in various mobile communication technologies. For example, the IEEE 802.16 and 802.20 which are standards for wireless Internet systems and standards for WIBRO systems have adopted Orthogonal Frequency-Division Multiple Access (OFDMA), and standardization for cellular systems is being carried out by the 3 Generation Partnership Project (3GPP). The multicarrier transmission reflects maximum delay of a wireless channel to transmit transmission symbols into which guard intervals are inserted. Insertion of guard intervals suppresses Inter-Symbol Interference (ISI) caused by wireless channel delay, periodically generates a channel matrix in a receiving terminal and allows simple channel equalization unlike channel compensation of CDMA transmission.

However, insertion of guard intervals may waste transmission power and limited frequency resources. For this reason, studies into reflecting complexity of a receiving part of a terminal in order not to insert guard intervals are underway. Meanwhile, in a Single Frequency Network (SFN) environment, such as a terrestrial broadcasting service or a Multimedia Broadcast Multicast Service (MBMS) of 3GPP LTE, extension of propagation paths of multipath waves needs processing of delay waves having a time delay above a guard interval. Various interference cancellation technologies have been developed so far, but studies into interference cancellation providing both a reduction of the amount of calculations and performance improvement have not yet given rise to significant development.

SUMMARY

The following description relates to a technique for cancelling interference between symbols or subcarriers due to a delayed wave having a delay time above a guard interval, through signal processing both in a time domain and in a frequency domain.

In one general aspect, there is provided an apparatus of receiving a signal to which a guard interval is added, including: an Inter-Symbol Interference (ISI) controller to cancel ISI in a time domain from a received signal having a time delay above the guard interval; and an Inter-Carrier Interference (ICI) controller to cancel ICI in a frequency domain from the received signal.

In another general aspect, there is provided an apparatus of receiving a signal to which a guard interval is added, including: an interference canceller to use a replica for a received symbol to cancel an Inter-Carrier Interference (ICI) and remaining Inter-Symbol Interference (ISI) in a frequency region from the received signal; and a feedback circuit, the feedback circuit including: a channel equalizer to compensate for channel distortion caused by noise and channel response characteristics of the received signal in a frequency domain; a decoder to decode the results of the compensation; a symbol selector to analyze bit-based Log-Likelihood Ratios (LLRs) of an output signal of the channel equalizer to select a symbol to be fed back to the channel equalizer; and a mapper to transfer the result of the mapping to the interference canceller.

In another general aspect, there is provided a method of cancelling interference in an apparatus of receiving a signal to which a guard interval is added, including: receiving a signal having a delay time above the guard interval; cancelling Inter-Symbol Interference (ISI) in a time domain from the received signal; and cancelling Inter-Carrier Interference (ICI) in a frequency domain from the received signal.

Therefore, by cancelling interference between symbols in a time domain and between subcarriers in a frequency domain from received signals having a delay time above a guard interval, calculations for interference cancellation may be efficiently distributed, which leads to improvement of reception performance.

Also, reliable symbol detection and feedback signal processing through channel equalization are achieved. Furthermore, error propagation may be avoided when symbols are fed back by preventing data symbols having a channel smaller than a threshold value from being fed back.

Other features and aspects will be apparent from the following detailed description, the drawings, and the claims.

BRIEF DESCRIPTION OF THE DRAWINGS

FIG. 3 shows an example of a predicted channel matrix.

Figure 1:
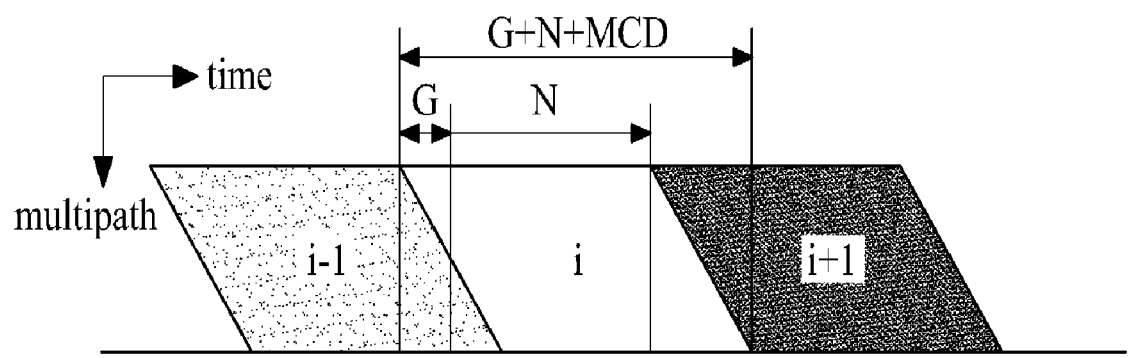
FIG. 1 is a view for explaining interference between symbols due to a delayed wave having a delay time above a guard interval.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 is a view for explaining interference between symbols due to a delayed wave having a delay time above a guard interval.

Referring to FIG. 1, in a wireless communication system based on multicarrier transmission, for example, based on orthogonal frequency division multiplexing (OFDM) transmission, a transmitting apparatus transmits signals after inserting a guard interval into each signal to be transmitted and thus a receiving apparatus receives signals into which guard intervals are inserted. Insertion of a guard interval is to copy, when an output signal composed of M sub carrier samples (1 symbol) is one unit, an end part of the unit to its head.

When a received signal is a delayed wave having a delay time above a guard interval, a receiving apparatus has to cancel interference of the delayed wave. However, data symbols transmitted through subcarriers may be exposed to interference by adjacent symbols and interference due to orthogonality failure between subcarriers in each symbol.

FIG. 1 illustrates OFDM symbols in a time domain of a received signal having a delay time above a guard interval. In the example of FIG. 1, it is assumed that there are three symbols of a previous $((i-1)^{th})$ symbol, a current $(i^{th})$ symbol and a next $((i+1)^{th})$ symbol, and data for the $i^{th}$ symbol is detected. In this case, signal components of the $(i-1)^{th}$ symbol may exist in the $i^{th}$ symbol having a N-point IFFT length, and the signal components become inter-symbol interference (ISI). In FIG. 1, G represents the length of the guard interval, MCD represents maximum channel delay and N represents the FFT length.

Figure 2:
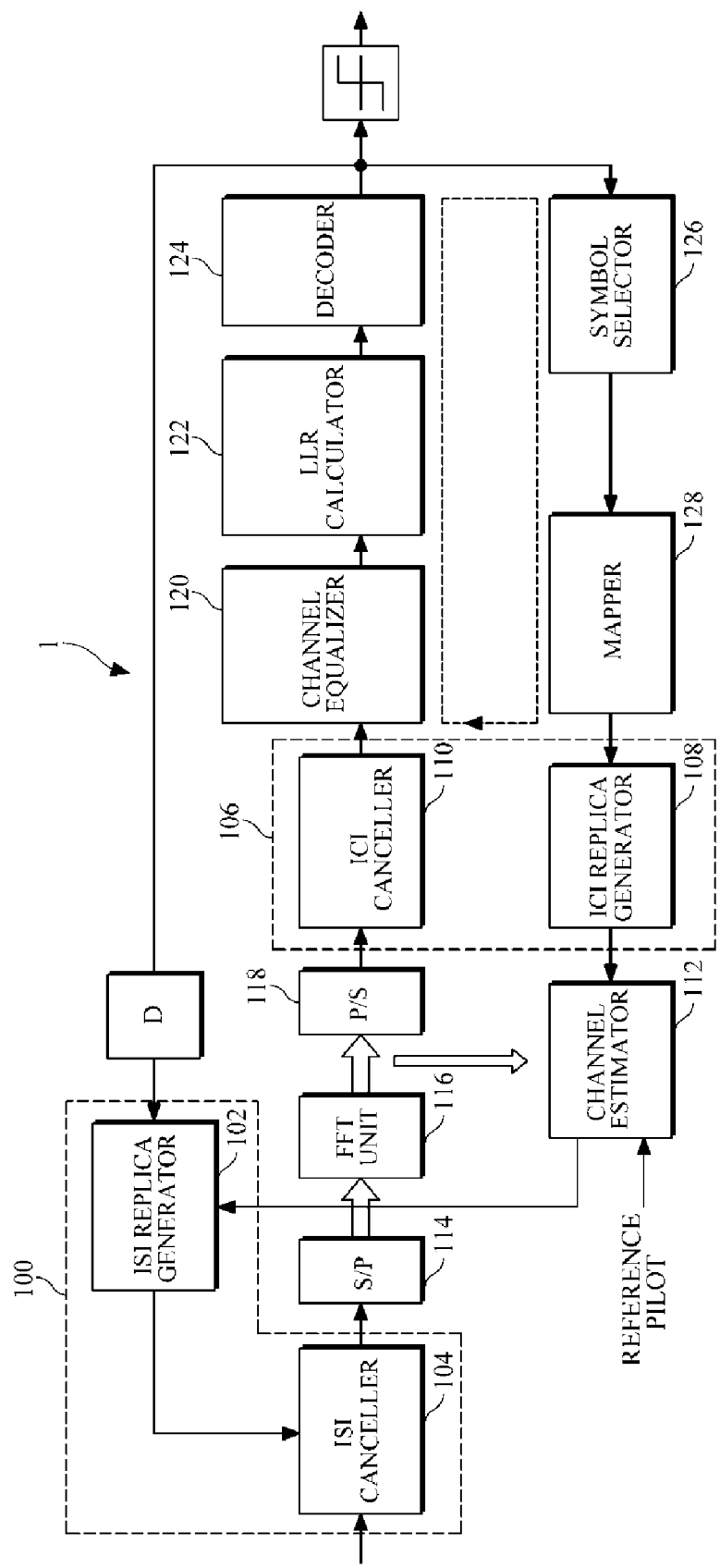
FIG. 2 is a diagram illustrating an example of a receiving apparatus to cancel received signals having a delay time above a guard interval.

FIG. 2 is a diagram illustrating an example of a receiving apparatus 1 to cancel received signals having the delay time above the guard interval.

Referring to FIG. 2, the receiving apparatus 1 includes a channel estimator 112, an ISI controller 100, an Inter-Carrier Interference (ICI) controller 106, a serial to parallel converter 114, a FFT unit 116 and a parallel to serial converter 118. The ISI controller 100 includes an ISI replica generator 102 and an ISI canceller 104, and the ICI controller 106 includes an ICI replica generator 108 and an ICI canceller 110. The ISI controller may further include a channel equalizer 120, a Log-Likelihood Ratio (LLR) calculator 122, a decoder 124, a symbol selector 126 and a mappper 128.

The channel estimator 112 performs channel prediction on each received subcarrier using a reference pilot symbol time-multiplexed by a transmitting apparatus.

The ISI controller 100 cancels ISI from a received signal having a delay time above a guard interval. The ICI controller 106 cancels ICI from the received signal. In the current example, the ISI controller 100 cancels ISI in a time domain and the ICI controller 106 cancels ICI in a frequency domain. Since the receiving apparatus 1 cancels ISI and ICI in different domain regions, calculations for interference cancellation may be efficiently distributed, which leads to improvement of reception performance.

According to an example, the ISI controller 100 generates a replica for a previous symbol in a time domain to cancel interference of the previous symbol from a current symbol, and thereafter the ICI controller 106 generates a replica for the current symbol from which the interference of the previous symbol has been cancelled in a time domain, thereby cancelling interference between subcarriers and between remaining symbols.

The serial to parallel converter (S/P) 114 converts the serial format of the signal from which ISI has been cancelled into a parallel format and then multi-transmits the converted signal in the form of a plurality of subcarriers. Then, the FFT unit 116 performs Fast Fourier Transform (FFT) on the signal converted into the parallel format to convert the signal in the time domain into a frequency domain signal. Thereafter, the parallel to serial converter (P/S) 118 converts the parallel-format signal subject to FFT into a serial-format signal.

The ISI replica generator 102 of the ISI controller 100 generates a time-domain ISI replica for an adjacent symbol from which ISI has been generated. The ISI replica generator 102 may remove a part which has been subjected to interference from a pilot symbol waveform and generate the part as an ISI replica. The ISI canceller 104 calculates the ISI replicas with an ISI channel prediction value $H_{ISI}$ obtained through channel response characteristic prediction performed on the received signal, and subtracts the result of the calculation from the received signal, thereby cancelling ISI.

The ICI replica generator 108 of the ICI controller 106 generates a frequency-domain ICI replica for adjacent data symbols from which ICI has been generated. The ICI canceller 110 calculates the ICI replica with an ICI channel estimation value $H_{ICI}$ obtained through channel response characteristic estimation performed on the received signal and subtracts the result of the calculation from the received signal, thereby cancelling ICI.

Meanwhile, the channel equalizer 120 compensates for channel distortion caused by a non-ideal characteristic of the received signal through a feedback circuit which cancels ISI in a frequency domain. The non-ideal characteristic may be noise, interference from adjacent channels, a multipath or the like. The feedback circuit feeds back symbols iteratively. The channel equalizer 120 may be a single tab frequency domain equalizer (Single tab-FDE). The channel equalizer 120 is provided to implement reliable symbol detection and feedback signal processing. The decoder 124 decodes the result of the compensation output from the channel equalizer 120.

The symbol selector 126 analyzes bit-based LLRs for the output signal of the decoder 124 to select symbols to be fed back to the channel equalizer 120. At this time, the symbol selector 126 selects symbols whose LLR values are larger than a predetermined threshold value $\beta_{thre}$ while excluding symbols whose LLR values are smaller than the predetermined threshold value $\beta_{thre}$ using the results of the LLR analysis. According to an example, the symbol selector 126 may calculate an average value of LLR values constructing each symbol and compare the LLR average value to the predetermined threshold value $\beta_{thre}$, thereby selecting symbols.

Accordingly, by selectively feeding back symbols through the symbol selector 126, error propagation which may be generated when symbols are fed back may be prevented. For example, by preventing symbols having LLR values smaller than a threshold value from being fed back, an increase of interference noise from a wrongly detected data symbol replica may be suppressed.

The mapper 128 maps each symbol selected by the symbol selector 126 to a data symbol. The mapper 128 transfers the results of the mapping to the IC replica generator 108, wherein specific carrier components of the mapping results may be "0".

The ICI interference canceller 110, the channel equalizer 120, the decoder 124, the symbol selector 126, the mapper 128 and the ICI replica generator 108 may be implemented as a feedback circuit.

Hereinafter, a technique for cancelling ISI and ICI in the receiving apparatus 1 will be described in detail with reference to attached drawings, based on schematic descriptions of the individual components of the receiving apparatus 1. In the following description, like reference numbers as those denoted in FIG. 2 are used.

A matrix for a received signal component in a frequency domain, subject to N-point FFT on an $i^{th}$ on an i symbol, can be expressed as Equation 1 below.

$$F^H HF = F^H (H_{ICI} + H_{ISI})F \qquad (1)$$
$$= \underbrace{F^H H_{ICI} F}_{\text{ICI replica gen}} + F^H H_{ISI} F$$

In Equation 1, F and FH represent an IFFT matrix and a FFT matrix, respectively, and H represents a channel matrix estimated from the received signal. The channel estimator 112 for channel estimation predicts a response characteristic of a wireless channel for a reception path.

FIG. 3 shows an example of an estimated channel matrix.

Referring to FIG. 3, the channel estimator 112 (see FIG. 2) may estimate a channel response of a channel matrix H={h_0, h_1, ..., h_{M-1}} which is written as the left matrix. The channel matrix H is a sum of matrices $H_{ICI}$ and $H_{ISI}$ that are respectively represented in the left and right parts of FIG. 3.

Figure 4:
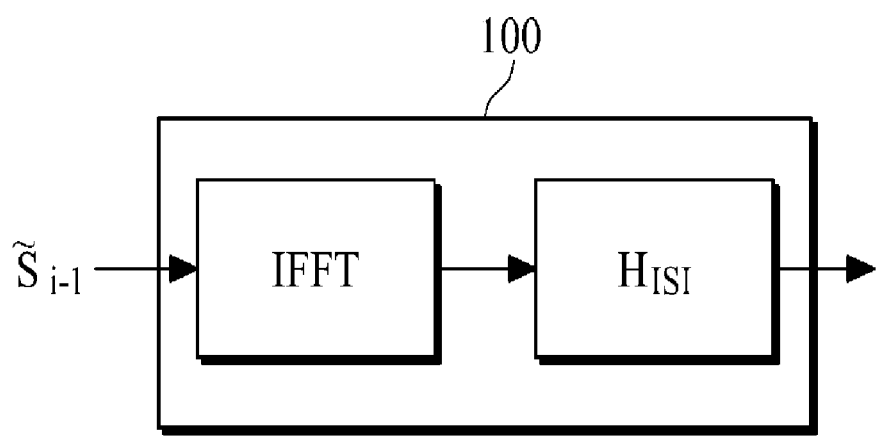
FIG. 4 is a view for explaining an example of a process of cancelling inter-symbol interference (ISI) in the receiving apparatus illustrated in FIG. 2.

FIG. 4 is a view for explaining an example of a process of cancelling ISI in the receiving apparatus 1 illustrated in FIG. 2.

Referring to FIGS. 2 and 4, the ISI controller 100 of the receiving apparatus 1 receives an $i^{th}$ symbol and cancels interference of symbols adjacent to the symbol in a time domain from the $i_{th}$ symbol. The ISI controller 100 multiplies, as illustrated in FIG. 4, the result of N-point is IFFT performed on the previous symbol, that is, an $(i-1)^{th}$ symbol by the $H_{ISI}$ channel matrix written in FIG. 3. Through the multiplication operation, the interference components from the adjacent symbols are cancelled. The interference components from the previous symbol are completely cancelled by the above-described method, excluding error components, upon detecting data of the previous symbol.

Figure 5:
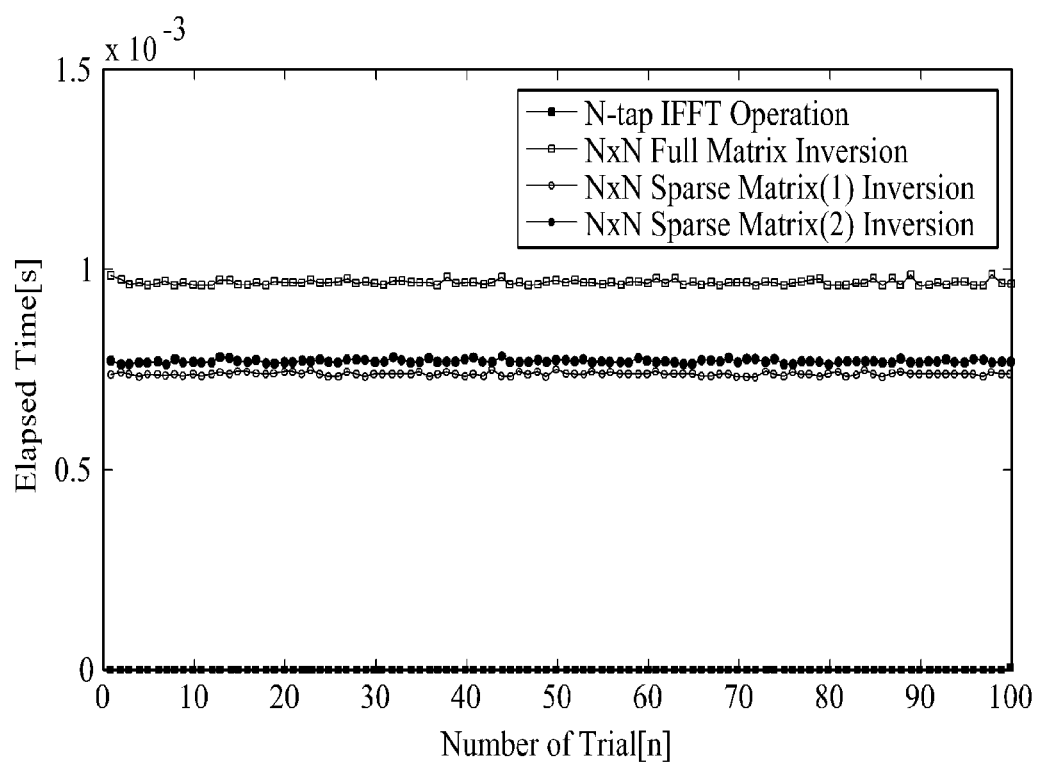
FIG. 5 is a simulation graph showing influence of ISI cancellation in a frequency domain on latency.

FIG. 5 is a simulation graph showing influence of ISI cancellation in a frequency domain on latency.

Referring to FIG. 5, if ISI cancellation is performed in a frequency domain, not in a time domain, no fast N-point FFT can be performed, which influences latency upon signal processing. In other words, it can be seen from estimated, elapsed times for matrix inversion in a time domain of various matrices, as shown in FIG. 5 that using highest N-point FFT/IFFT to plan interference cancellation is efficient in light of signal processing latency.

Figure 6:
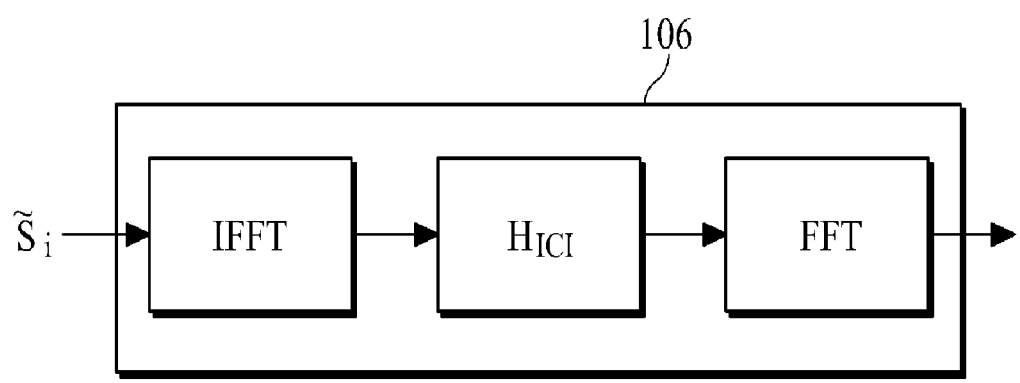
FIG. 6 is a view for explaining an example of a process of cancelling inter-carrier interference (ICI) in the receiving apparatus illustrated in FIG. 2.

FIG. 6 is a view for explaining an example of a process of cancelling inter-carrier interference (ICI) in the receiving apparatus 1 illustrated in FIG. 2.

Referring to FIGS. 2 and 6, ICI cancellation is performed in a frequency domain through the ICI controller 106 of the receiving apparatus 1 (see FIG. 2). If a channel matrix $H_{ICI}$ satisfies the necessary condition for a circulant channel matrix, the first term of Equation 1 becomes the form of a diagonal matrix. However, since the channel matrix $H_{ICI}$ is not a diagonal matrix, as represented in FIG. 3, the result of the ICI cancellation through the process of FIG. 6 shows distributions of FIG. 7.

Figure 7:
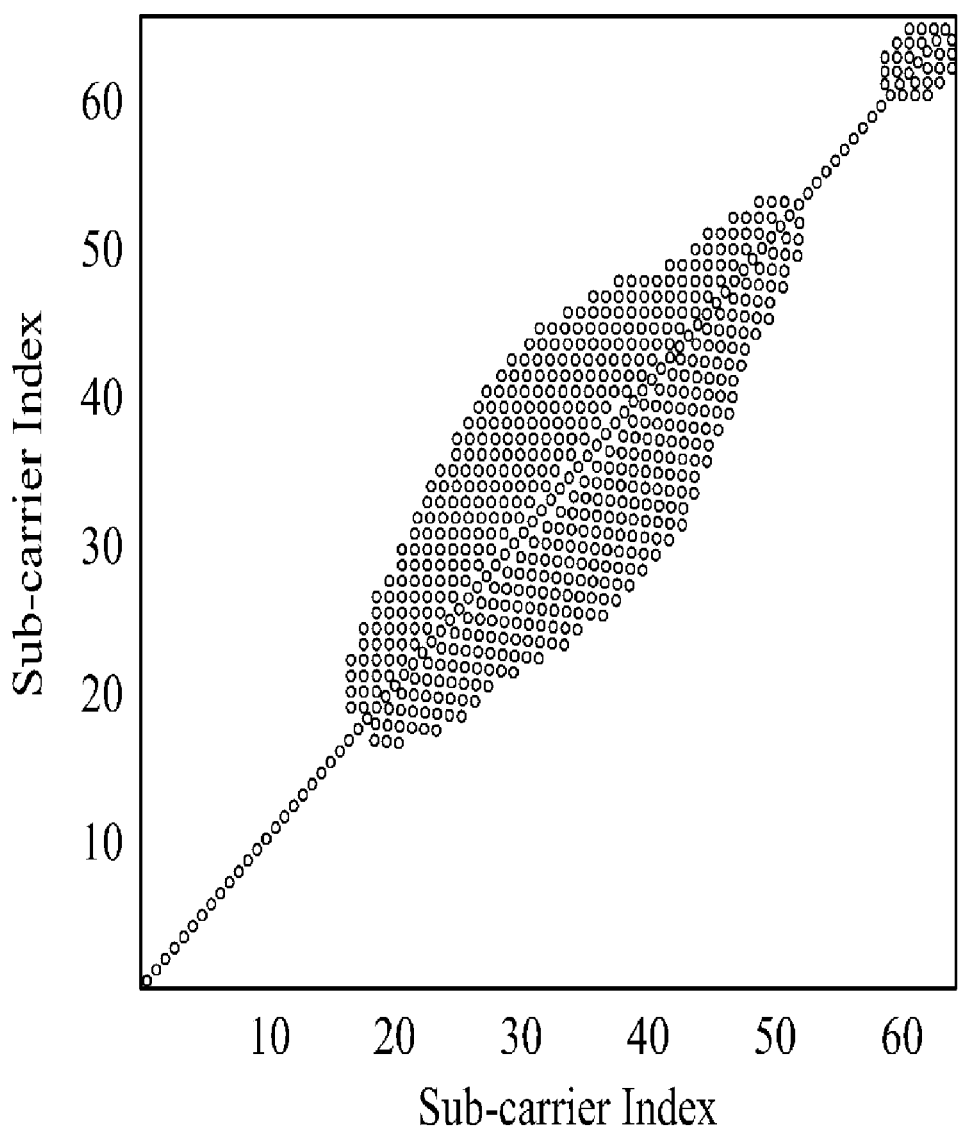
FIG. 7 is a view for explaining the amount of interference generated when $H_{ICI}$ illustrated in FIG. 6 does not satisfy the necessary condition for a circulant matrix.

FIG. 7 is a view for explaining the amount of interference generated when $H_{ICI}$ illustrated is in FIG. 6 does not satisfy the necessary condition for a circular matrix. Referring to FIG. 7, ICI is generated in the remaining components excluding diagonal components.

Accordingly, the receiving apparatus 1 estimates the amount of ICI and removes the estimated amount of ICI from Equation 1, which is illustrated in FIG. 6. Then, the receiving apparatus 1 performs channel compensation on diagonal components illustrated in FIG. 7 using Equation 2 below.

$$H(k) = \sum_{l=0}^{M-1} h_l \exp\left(-j\frac{2\pi}{N}lk\right) \qquad (2)$$

H(k) consists of a channel matrix which is a channel transfer function for an $i^{th}$ frame at a subcarrier frequency of fk=k/T. As described above, for ISI and ICI cancellation, a replica for a previous symbol and a replica for a symbol currently being signal-processing have to be acquired. After ISI has been cancelled, the resultant frequency domain signal still contains ICI and remaining ISI. In this state, detecting data for each subcarrier in order to create a replica for an $i^{th}$ symbol being currently signal-processed may deteriorate reliability.

In order to avoid such reliability deterioration, referring to FIG. 3, the receiving apparatus 1 cancels ISI through the ICI canceller 110. Then, channel compensation of Equation 2 is performed on the signal in the frequency domain through the channel equalizer 120. Successively, Log-Likelihood Ratios (LLRs) are calculated through the LLR calculator 122 and the result of the channel compensation is transferred to the decoder 124. LLR components from which noise is removed by acquiring channel coding gain are fed back through a feedback circuit in order to cancel ICI components. LLRs for respective bits of the output of the decoder 124 are transferred to the mapper 128 to be mapped to data symbols. At this time, if an ideal interleaver is used for mapping, LLRs for individual bits constituting each symbol will be a nearly constant level of value.

However, if LLRs for bits constituting a certain symbol are not constant, some LLRs may have low reliability. According to the current example, a method of obtaining an average value of LLRs of bits constituting each symbol and preventing symbols each of whose LLR average value does not exceed a certain level, that is, a threshold value $\beta_{thre}$ from being mapped is used.

A data vector $\tilde{S}_i$ input to the ICI canceller 110 to cancel ICI components includes subcarrier components of "0". The data vector $\tilde{S}_i$ is estimated as ICI components through the process described above with reference to FIG. 6. Accordingly, error propagation upon ICI cancellation through feedback may be prevented.

Figure 8:
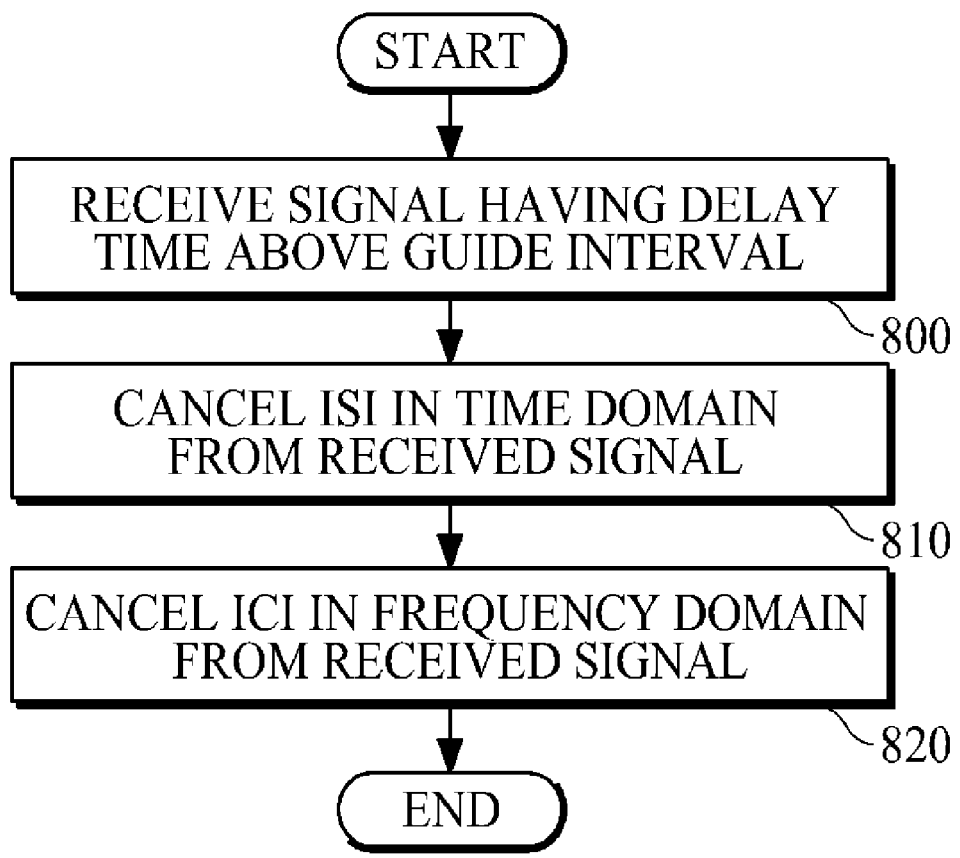
FIG. 8 is a flowchart illustrating an example of a method of receiving signals in the receiving apparatus illustrated in FIG. 2.

FIG. 8 is a flowchart illustrating an example of a method of receiving signals in the receiving apparatus 1 illustrated in FIG. 2.

Referring to FIG. 8, the receiving apparatus 1 receives a signal having a delay time above a guard interval (operation 800). Then, ISI is cancelled in a time domain from the received signal (operation 810). Successively, ICI is cancelled in a frequency domain from the signal from which the ISI has been cancelled (operation 820). According to an example, in operation 810, the receiving apparatus 1 generates a replica for a previous symbol in a time domain to cancel interference of the previous symbol from a current symbol. Also, in operation 820, the receiving apparatus 1 generates a replica for the current symbol from which the interference of the previous symbol has been cancelled in a frequency domain so as to cancel ICI and remaining ISI.

According to an example, in operation 810, the receiving apparatus 1 generates a time-domain ISI replica for an adjacent symbol where ISI has been generated. Then, the receiving apparatus 1 calculates the ISI replica with an ISI channel estimation value obtained through channel response characteristic estimation performed on the received signal, and subtracts the result of the calculation from the received signal, thereby cancelling ISI.

Also, in operation 820, the receiving apparatus 1 generates a frequency-domain ICI replica for an adjacent symbol where ISI has been generated. Then, the receiving apparatus 1 calculates the ICI replica with an ICI channel estimation value obtained through channel response characteristic estimation performed on the received signal and subtracts the result of the calculation from the received signal, thereby cancelling ISI.

According to another example, operation 820 may further include operation in which the receiving apparatus 1 compensates for channel distortion caused by noise and a channel response characteristic of the received signal and decodes the results of the compensation.

In addition, operation 820 may further include operation in which the receiving apparatus 1 analyzes bit-based LLRs for a decoded output signal to select symbols to be fed back to a feedback circuit and map the selected symbols to data symbols.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for receiving a signal to which a guard interval is added, comprising:
   an Inter-Symbol Interference (ISI) controller to cancel ISI in a time domain from a received signal having a time delay above the guard interval; and
   an Inter-Carrier Interference (ICI) controller to cancel ICI in a frequency domain from the received signal,
   wherein the ICI controller comprises:
   an ICI replica generator to generate a frequency-domain ICI replica for an adjacent symbol from which ICI has been generated; and
   an ICI canceller to calculate the frequency-domain ICI replica with an ICI channel estimation value obtained through channel response characteristic estimation performed on the received signal and to subtract the result of the calculation from the received signal, thereby cancelling the ICI,
   a channel equalizer to compensate for channel distortion caused by noise and frequency response characteristics of the received signal; and
   a decoder to decode the result of the compensation,
   a symbol selector to analyze bit-based Log-Likelihood Ratios (LLRs) for an output signal of the decoder to select a symbol to be fed back to the channel equalizer; and
   a mapper to map the selected symbol to a data symbol.

2. The apparatus of claim 1, wherein the ISI controller generates a replica for a previous symbol in the time domain to cancel interference of the previous symbol from a current symbol, and the ICI controller generates a replica for the current symbol from which the interference of the previous symbol has been cancelled in the frequency domain to cancel the ICI and remaining ISI.

3. The apparatus of claim 1, wherein the ISI controller comprises:
   an ISI replica generator to generate a time-domain ISI replica for an adjacent symbol from which ISI has been generated; and
   an ISI canceller to calculate the time-domain ISI replica with an ISI channel estimation value obtained through channel response characteristic estimation performed on the received signal and to subtract the result of the calculation from the received signal, thereby cancelling the ISI.

4. The apparatus of claim 1, wherein the channel equalizer is a single tap frequency domain equalizer (FDE).

5. The apparatus of claim 1, wherein the symbol selector uses the result of the analysis to select symbols whose LLR values are larger than a predetermined threshold value while excluding symbols whose LLR values are smaller than the predetermined threshold value.

6. The apparatus of claim 5, wherein the symbol selector calculates an average value of LLR values of bits constructing each symbol and compares the LLR average value to the predetermined threshold value.

7. The apparatus of claim 1, wherein the mapper transfers the result of the mapping to the ICI replica generator and a specific subcarrier component of the transferred value is "0".

8. A method of cancelling interference in an apparatus for receiving a signal to which a guard interval is added, comprising:
   receiving a signal having a delay time above the guard interval;
   cancelling Inter-Symbol Interference (ISI) in a time domain from the received signal; and
   cancelling Inter-Carrier Interference (ICI) in a frequency domain from the received signal,
   wherein the cancelling of the ICI comprises:
   generating a frequency-domain ICI replica for an adjacent symbol from which ICI has been generated; and
   calculating the frequency-domain ICI replica with an ICI channel estimation value obtained through channel response characteristic estimation performed on the received signal, and subtracting the result of the calculation from the received signal to cancel the ICI,
   compensating for channel distortion caused by noise and a channel response characteristic of the received signal through a feedback circuit which cancels the ICI in a frequency domain; and
   decoding the result of the compensation, analyzing bit-based Log-Likelihood Ratios (LLRs) for the result of the decoding to select a symbol to be fed back to the feedback circuit; and mapping the selected symbol to a data symbol.

9. The method of claim 8, wherein the cancelling of the ISI comprises generating a replica for a previous symbol in the time domain to cancelling interference of the previous symbol from a current symbol, and the cancelling of the ICI comprises generating a replica for the current symbol from which the interference of the previous symbol has been cancelled in a frequency domain to cancel ICI and remaining ISI.

10. The method of claim 8, wherein the cancelling of the ISI comprises:

generating a time-domain ISI replica for an adjacent symbol from which ISI has been generated; and calculating the time-domain ISI replica with an ISI channel estimation value obtained through channel response characteristic estimation performed on the received signal, and subtracting the result of the calculation from the received signal to cancel the ISI.

* * * * *